United States Patent [19]
Williams, III

[11] Patent Number: 4,970,915
[45] Date of Patent: Nov. 20, 1990

[54] REVERSIBLE UNIDIRECTIONAL TRANSMISSION

[76] Inventor: Thomas A. Williams, III, Arlington, Va.

[21] Appl. No.: 268,263

[22] Filed: Nov. 7, 1988

Related U.S. Application Data

[63] Continuation-in-part of Ser. No. 934,102, Nov. 23, 1986, Pat. No. 4,802,387.

[51] Int. Cl.⁵ .................... G16H 5/52; B25B 17/00
[52] U.S. Cl. .................................. 74/810.1; 74/134; 74/157; 81/57.31
[58] Field of Search ............... 74/812, 792, 143, 158, 74/159, 161, 168, 134, 33, 34, 35, 136, 137, 157, 810.1; 81/57.3, 57.31, 57.39, 57.46, 58.4, 59.1, 60, 61, 62, 63.1, 57.22, 58.1

[56] References Cited

U.S. PATENT DOCUMENTS

| | | | |
|---|---|---|---|
| 275,436 | 4/1883 | Tauber | 74/134 |
| 392,610 | 11/1888 | Hoffman | 74/812 |
| 708,286 | 9/1902 | Wild, Jr. | 74/812 |
| 725,551 | 4/1903 | Gentry | 74/134 |
| 778,855 | 1/1905 | Goldmann | 74/134 |
| 778,856 | 1/1905 | Goldmann | 74/134 |
| 799,946 | 9/1905 | Slocum | 74/126 |
| 825,791 | 7/1906 | Young | 74/812 |
| 832,077 | 10/1906 | Pearce | 74/134 |
| 1,097,571 | 5/1914 | Thurlow | 74/134 |
| 1,351,393 | 8/1920 | Marshall | 74/812 |
| 1,860,914 | 5/1932 | Wellman | 81/57.31 |
| 2,641,136 | 6/1953 | Marsden, Jr. et al. | 74/792 X |
| 2,808,749 | 10/1957 | Lampke | 81/58.1 X |
| 3,467,231 | 9/1969 | Haznar | 81/62 X |
| 3,828,629 | 8/1974 | Moore | 81/57.3 |
| 3,983,759 | 10/1976 | Linden | 81/57.3 X |
| 4,280,379 | 7/1981 | Chow | 81/62 |
| 4,357,844 | 11/1982 | Welbon | 81/57.31 X |
| 4,366,731 | 1/1983 | Vallevand | 81/57.3 |
| 4,406,184 | 9/1983 | Cockman, Jr. | 81/58.1 X |
| 4,426,895 | 1/1984 | Lack | 81/57.31 X |
| 4,507,990 | 4/1985 | Lack | 81/57.31 X |
| 4,770,071 | 9/1988 | Steier | 81/60 X |
| 4,777,852 | 10/1988 | Herman et al. | 81/63.1 |
| 4,802,387 | 2/1987 | Williams, III | 74/812 |

FOREIGN PATENT DOCUMENTS

567138 5/1958 Belgium .......................... 74/379

*Primary Examiner*—Dwight Diehl
*Attorney, Agent, or Firm*—Barnes & Thornburg

[57] ABSTRACT

A transmission including two input members for independently driving an output member in a single direction. The direction of the output is reversible. One of the inputs may be a handle and another a motor in the handle.

13 Claims, 6 Drawing Sheets

REVERSIBLE UNIDIRECTIONAL TRANSMISSION

RELATED U.S. APPLICATION DATA

The present application is a continuation-in-part application of U.S. application Ser. No. 934,102, filed Nov. 23, 1986 now U.S. Pat. No. 4,802,387.

BACKGROUND AND SUMMARY OF THE INVENTION

The present invention relates to the transmission of input from two members into a unidirectional output. Further, the output can be reversed. Further, certain embodiments of the invention relate to power transmission into an output member.

In certain transmission arrangements, such as hand tools, it is common to provide an input member which drives in one direction and ratchets free in a second direction. This ratcheting is wasted motion, as it is not converted into drive of the output member. Further, other arrangements are known which include oscillatory input to provide unidirectional output. However, in these arrangements, all of the input is interdependent. When an input member is driven, all other parts of the input are also automatically moved in some way. These arrangements do not provide independent input elements. An example of a patent providing interdependent input is U.S. Pat. No. 778,855 to Goldmann.

According to specific embodiments, including the motor, it is known to include a motor in such devices as motor driven screwdrivers. However, in these arrangements, there are only three settings. One setting drives the output in a clockwise direction. Another setting drives the output in a counterclockwise direction. The final setting locks the output so that it can be manually driven in either direction directly. Because of the arrangement of the motor drive, these known devices do not provide for a setting which allows drive of an output in only one direction when the motor is not operable, with free ratcheting in the other direction.

It is an object of the present invention to provide a transmission which produces unidirectional output through two input members such that there is no lost motion on a return swing of one of the input members.

It is another object of the present invention to provide such a transmission with reversibility such that the output member can be reversed without changing the relative movement of the input members.

It is still a further object to provide a transmission for use with a motor which is also capable of unidirectional drive for oscillatory motion.

These objects are achieved by providing first and second input members which are independently operable from one another. Engaging elements are provided for directly engaging between the input members and an output member, thereby transferring rotation of the input members to the output members. A reversing element is provided which has two positions. In a first position, the reversing member provides engagement between the first and second input members when these input members are rotated in a first direction and allows free rotation of the input members relative to the output member in a second direction. The reversing members' second position reverses the direction of output by engaging the input members when rotated in the second direction and allows free rotation in the first direction.

According to advantageous features of certain preferred embodiments of the invention, a motor element is provided for automatically driving at least one of the input members. In certain preferred embodiments, the motor element is arranged such that it can drive the output member in a first direction and allows ratcheting or free motion if a handle is moved opposite to the first direction. Thus, the motor element does not lock up the output member and ratcheting action is permitted. In this embodiment, the output member can be drive by a handle and/or automatically by a motor element in a given direction and ratcheting is provided when the handle is moved opposite to the direction of the desired output. This is especially advantageous such that for low torque operation, the motor element can exclusively drive the output and/or high torque operations which may not be suitable for small battery operated motors, normal manual ratchet wrench operation can be provided without locking up the motor with the output member.

Other objects, advantages and novel features of the present invention will become apparent from the following detailed description of the invention when considered in conjunction with the accompanying drawings.

DETAILED DESCRIPTION OF THE DRAWINGS

Figures 1, 2:
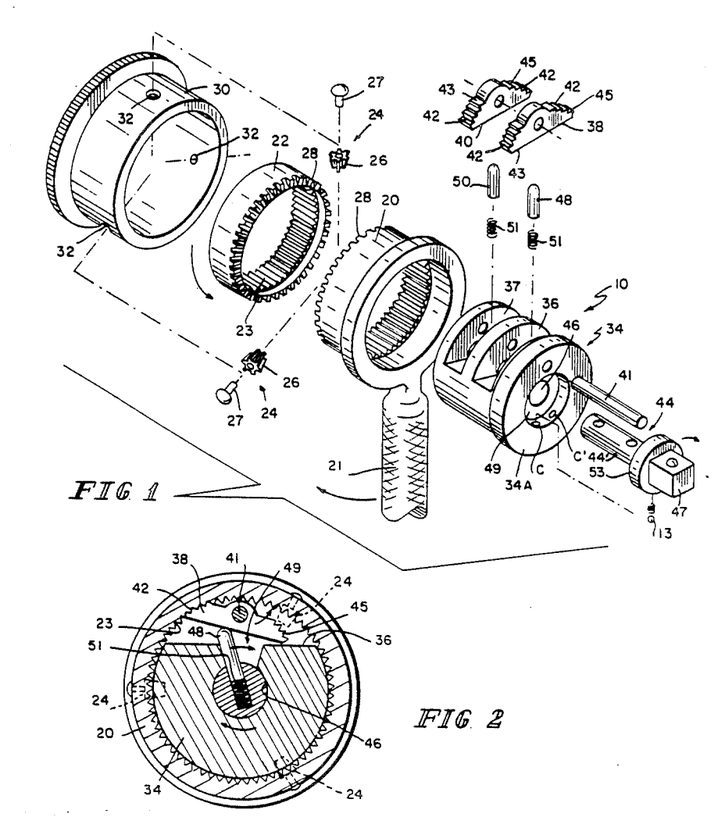
FIG. 1 is an exploded view of one embodiment of the transmission device.
FIG. 2 is an end cross-sectional view of the output member, engaging member and reversing means of the embodiment of the transmission device shown in FIG. 1.

With reference to the exploded view in FIG. 1, a transmission 10 includes a first annular ring 20 connected to a handle 21 and aligned adjacent a second annular ring 22. Each annular ring includes axially extending teeth 28 on at least one axial surface and radially extending teeth 23 on at least one circumferential surface. An intermediate pinion 24 having engaging teeth 26 is disposed between annular rings 20 and 22, and teeth 26 of the pinion mesh with corresponding teeth 28 on the annular rings. In the preferred embodiment, three such pinions 24 are arranged in equal distances around the annular rings. Annular ring 22 is enclosed within a holding member 30 and annular ring 20 is partially enclosed in holding member 30 having the portion attached to handle 21 not enclosed. The pinions 24 are positioned inside the holding member 30 and are supported on pins 27 which extend through holes 32 in the holding member 30. In order for the rotation of the input member or handle 21 to be transmitted to the second annular ring 22 via pinion 24, the user grips holding member 30 holding it stationary.

An output member 34 is rotatably disposed within the annular rings 20, 22. The output member 34 has two circumferential slots 36, 37. Slot 36 is disposed underneath annular ring 20 and slot 37 is disposed underneath annular ring 22. A pawl 38 is pivotably mounted within slot 36 and pawl 40 is pivotably mounted within slot 37 on a common pin 41. Each of the pawls has teeth 42 on opposite ends 43, 45 as shown in FIG. 2.

A reversing member 44 is provided which is received in aperture 46 of the output member 34. The reversing member has a circular plate 53 which is received within mouth 49 of an end plate 34A of the output member which is integral with the output member. The reversing member 44 has an integral head 47 which extends from the circular plate away from the output member 34 and serves as the attachment for elements to be driven. The reversing member 44 has a portion 44' which extends into the aperture 46 of the output member. This portion 44' has a pin 48 associated with pawl 38 and a pin 50 associated with pawl 40. Spring members 51 urge the pins 48 and 50 radially outward into slots 36 and 37, respectively, and against the pawls 38 and 40 respectively.

The circular plate 53 includes a ball spring B on the face of the outer circumference which faces the inner edge of the end plate mouth 49. This edge of the end plate mouth 49 has two indentations C, C' which cooperate with the ball spring B. To drive the output member in the clockwise direction, the reversing member 44 is rotated counterclockwise relative to the output member end plate 34A until the ball B engages in indentation C'. To reverse the output to the counterclockwise direction, the reversing member 44 is rotated clockwise relative to the output member until the ball spring engages in indentation C. The ball spring will retain the parts in the proper position during operation and is easily disengaged from the indentations when reversal of directions is desired.

In operation, the handle 21 is rotated, thereby rotating annular ring 20 in the same direction in which the handle is moved. Intermeshing pinions 24 transmit motion to annular ring 22 thereby rotating annular ring 22 in a direction opposite to the rotation of annular ring 20. The holding member 30 is held stationary to prevent the pinions 24 from rotating around in the plane of rotation of the annular rings thus allowing transmission of the rotation of the annular rings in opposite directions.

To operate the output member in a clockwise direction relative to FIGS. 1 and 2, reversing member 44 is positioned in aperture 46 so that ball spring B locks into indentation C' of the end plate 34A. Pins 48 and 50 will force ends 43 of pawls 38, 40 above the outer circumferential surface of the output member 34 and ends 45 of pawls 38, 40 below the outer circumferential surface of output member 34. Thus, teeth 42 on end 43 of the pawls 38, 40 will engage teeth 23 of annular rings 20, 22, and teeth 42 on end 45 of the pawls 38, 40 will not engage teeth 23 of the annular rings 20, 22.

When the handle 21 is moved in a clockwise direction, annular ring 20 will move in a clockwise direction. Annular teeth 23 on the inside of annular ring 20 will engage teeth 42 on end 43 of the pawl 38 and will force the output member 34 to rotate in a clockwise direction. Pinion 24 will rotate annular ring 22 in a counterclockwise direction and the teeth 23 of annular ring 22 will ride over the teeth 42 on side 43 of pawl 40 forcing them down into recess 37. Thus, annular ring 22 will not be engaged with output member 34.

When the handle 21 is rotated in a counterclockwise direction, annular ring 20 will rotate in a counterclockwise direction. Teeth 23 of the annular ring 20 will ride over teeth 42 of side 43 of the pawl 38 forcing them down into recess 36. Bevel teeth 28 of annular ring 20 will rotate pinion 24. Pinion 24 will rotate annular ring 22 in a clockwise direction while the holding member 30 is held stationary by the user, and the teeth 23 of annular ring 22 will engage the teeth 42 of side 43 of pawl 40, thereby moving the output member 34 in the clockwise direction.

Thus, the output member 34, in the first mode, rotates in the clockwise direction irrespective of the direction of rotation of the handle 21.

Rotation of the output member in a counterclockwise direction is accomplished by rotating reversing member 44 in aperture 46 until ball spring B locks into indentation C of the end plate 34A, so that pins 48 and 50 urge end 45 of pawls 38, 40 upwardly. The teeth 42 on end 45 of the pawls are thereby forced above the outer circumferential surface of output member 34 and the teeth 42 of end 43 of the pawls are forced below the surface of the outer circumferential surface of output member 34.

When handle 21 is moved in a clockwise direction, annular ring 20 is moved in a clockwise direction, and teeth 23 of annular ring 20 ride over teeth 42 of the pawl 38 and force them down into the recess 36. Bevel teeth 28 of annular ring 20 will rotate pinion 24. Pinions 24 will then rotate annular ring 22 in the counterclockwise direction while the holding member 30 is held stationary by the user. Teeth 23 of annular ring 22 engage teeth 42 of pawl 40 on end 45, thereby moving the output member 34 in a counterclockwise direction.

When the handle 21 is moved in the counterclockwise direction, annular ring 20 is moved in a counterclockwise direction. Teeth 23 of annular ring 20 engage teeth 42 of pawl 38 on end 45 and rotate output member 34 in the counterclockwise direction. Annular ring 22, caused to move in the clockwise direction by pinion 24, rides over teeth 42 of the pawl 40 and forces them down into recess 37. The output member is thus rotated in the counterclockwise direction irrespective of the direction of rotation of the input member 11.

Figures 3, 3A, 4, 5:
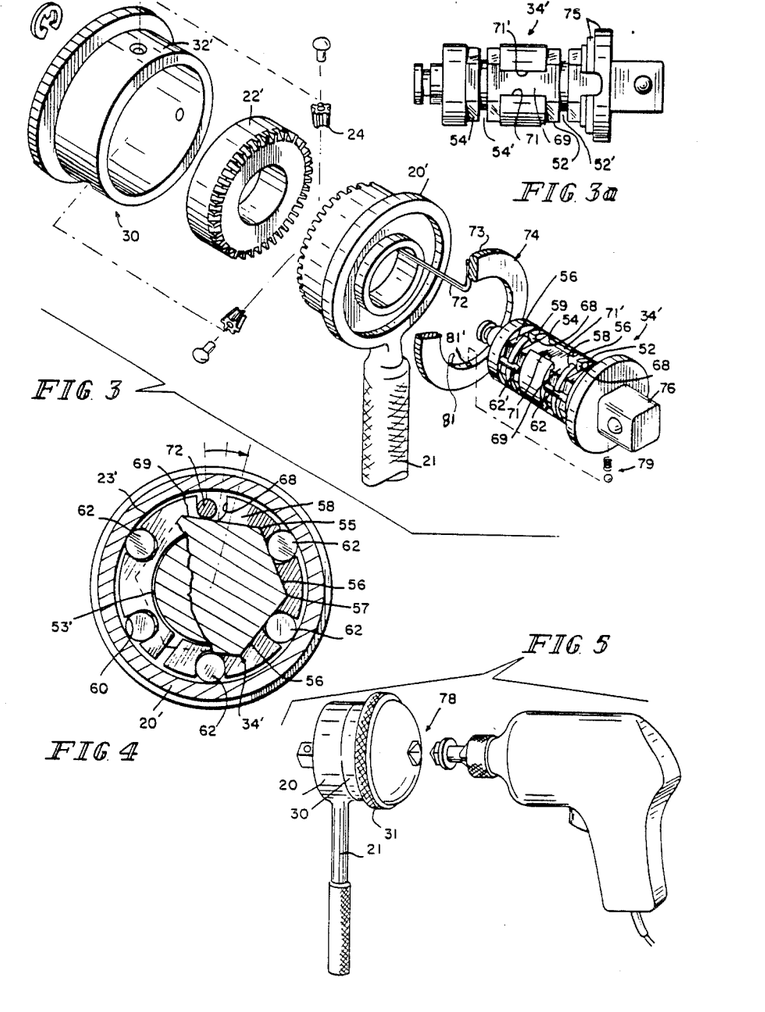
FIG. 3 is an exploded view of another embodiment of the transmission device.
FIG. 3a is a side view of the output member of FIG. 3.
FIG. 4 is an end cross-sectional view of the output member, engaging means and an annular ring of the embodiment of the transmission device shown in FIG. 3.
FIG. 5 is a side view of the transmission device having a special attachment member.

Another preferred embodiment is shown in FIGS. 3, 3A and 4. Output member 34' has two adjacent circumferential grooves 52 and 54 around the perimeter of the output member. The base of grooves 52, 54 have polygonal faces 56. The polygonal faces 56 each have outer ends 55, 57. A flexible roller ring 58 is rotatably disposed within a ring groove 52' within groove 52 and a flexible roller ring 59 is rotatably disposed within a ring groove 54' within groove 54 (shown in FIG. 3a). The roller rings 58, 59 can have a slit to allow them to be slipped over the output member into the roller ring grooves. Roller ring 58 is associated with annular ring 20' and roller ring 59 is associated with annular ring 22'. Each roller ring has slots 60 spaced apart on its outer circumference. Rollers 62, 62' are disposed in the slots 60 of roller rings 58, 59 respectively and contact faces 56 of the polygonal grooves. When the rollers are positioned in the middle of faces 56 of the polygonal grooves they do not engage the annular ring 20', 22'. However, as the rollers are moved toward either end 55, 57 of the faces of the polygonal grooves, the outer diameter of the rollers extend above the outer diameter of the output member 34', and rollers 62 contact the annular ring 20' and rollers 62' contact annular ring 22'.

Figures 11, 12:
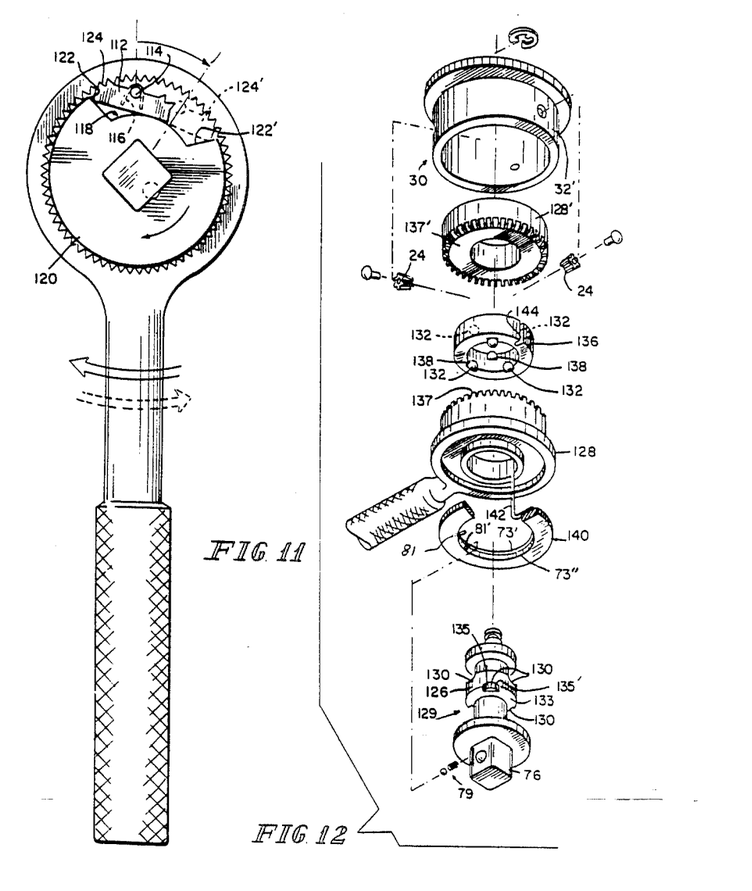
FIG. 11 is a schematic view of another embodiment of the reversing means of the transmission device.
FIG. 12 is an exploded view of another embodiment of the engaging means of the transmission device.

In one of the slots 60 of each roller ring a reversing pin slot is disposed. A reversing member 74 has a ring 73 and a pin 72 which is inserted into reversing pin slot 68 of each roller ring 58, 59. The ring 73 has a raised inner lip 73' and an inner ring surface 73" as shown in FIG. 12. The output member 34' includes an integral tiered plate 75 which is rotatably received within the inner lip 73' and inner ring surface 73" of the reversing member ring 73. The reversing pin 72 is positioning in a recessed portion 69 of the outer circumference of the output member 34' and is parallel to the output member. This recessed portion has a surface continuous with one of the faces 56 of the polygonal groove.

In operation, the reversing member 74 is rotated until reversing pin 72 abuts edge 71 or edge 71' of the recessed portion 69 of the output member 34'. The reversing pin 72 positions the roller rings 58, 59 relative to the output member 34', and once placed in an operative position against edge 71 or edge 71', prevents the roller rings 58, 59 from rotating relative to the output member 34'. The output member 34' includes a snapping spring ball lock device 79 which engages in indentations 81, 81' in the inner surface 73" of the reversing ring 73, to hold the pin 72 in position against edge 71 or edge 71'.

For clockwise output-member rotation, the reversing ring 73 is rotated clockwise with respect to output member to snap the spring ball device 79 into indentation 81'. For counter clockwise output member rotation, the reversing ring 73 is rotated counter clockwise with respect to the output member to snap the spring ball device 79 into indentation 81'.

In another preferred embodiment the reversing member 74 and the roller rings 58, 59 are unitary.

In operation, as with the first embodiment discussed, the handle 21 is rotated thereby rotating annular ring 20' in the same direction that the handle is rotated. Intermeshing pinions 24 transmit motion to annular ring 22' thereby rotating annular ring 22' in a direction opposite to the rotation of annular ring 20'. The holding member 30 is held in place to prevent the pinions 24 from rotating around in the plane of rotation of the annular rings.

To operate the output member in a clockwise direction relative to FIGS. 3 and 4, the reversing ring 73 is rotated clockwise until reversing pin 72 is moved against edge 71' of the recessed portion 69 of the output member 34'. When the handle 21 is moved in clockwise direction, annular ring 20' will move in a clockwise direction. The inner surface 23' of annular ring 20' will roll the rollers 62 toward outer edges 57 of the polygonal faces 56 enough to wedge the rollers between the annular ring 20' and the polygonal faces 56. Thus, output members 34' will rotate with the annular ring 20'. Pinion 24 will rotate annular ring 22' in the counterclockwise direction thus spinning the rollers 62' in a counterclockwise direction. The reversing pin 72 inserted in reversing slots 68 of the roller rings 58, 59 will prevent the roller rings from rotating in the counterclockwise direction. The flexibility of the roller ring 59 allows the rollers 62' to spin freely as the annular ring 22' rotates in the counterclockwise direction. Therefore, the output member will only be rotated in a clockwise direction.

When the handle is rotated in a counterclockwise direction, annular ring 20' will rotate in a counterclockwise direction. The rollers 62 will thus be rotated in a counterclockwise direction and will spin freely due to the flexibility of roller ring 58. Pinion 24 will rotate annular ring 22' in a clockwise direction, thus spinning the rollers 62' of the roller ring 59 in a clockwise direction and urging the rollers 62' toward the outer end 57 of the faces 56 of the polygonal groove 54. The rollers 62' become wedged between the outer end 57 of the faces 56 of the polygonal groove 54 and the annular ring 22', thereby output member 34' is moved in the clockwise direction.

To reverse the direction of the output member to the counterclockwise direction, the reversing member ring 73 is rotated so that reversing pin 72 abuts edge 71 of the recessed portion 69 of the output member 34'. Because the reversing pin 72 is received in slots 68 of the roller rings 58, 59, these rings will be rotated into a position so that rollers 62, 62' will be moved close to outer ends 55 of the faces 56 of the polygonal grooves 52, 54.

As the handle 21 is rotated in the clockwise direction annular ring 20' rotates in the clockwise direction. The rollers 62 in roller ring 58 will be rotated in the clockwise direction and the flexibility of the roller ring 58 will allow free spinning of the rollers 62. Pinion 24 will rotate annular ring 22' in a counterclockwise direction thereby rolling the rollers 62' in a counterclockwise direction. The rollers 62' will become wedged between the annular ring 22' and the faces 56 of the polygonal groove 54. The output member 34' will thus be rotated in the counterclockwise direction.

When the handle is rotated in the counterclockwise direction, annular ring 20' will rotate in a counterclockwise direction. The rollers 62 will be rotated in a counterclockwise direction and will roll toward the outer ends 55 of the faces 56 of the polygonal groove 52 thus forcing the rollers 62 to become wedged between the faces 56 of the groove 52 and the annular ring 20'. Pinion 24 will rotate annular ring 22' in a clockwise direction thereby rolling the rollers 62' in a clockwise direction. The flexibility of roller ring 59 will allow free spinning of the rollers 62' in the clockwise direction Therefore, the output member 34' will only be rotated in the counterclockwise direction regardless of the direction of rotation of the input member.

In another embodiment of the invention springs can be placed between the housing and the annular ring 22' not attached to the handle to bias this annular ring against the pinions and the other annular ring 20'.

In one application of this device, the transmission is used in a hand tool for rotating sockets. As shown in the embodiment in FIG. 1, reversing head 47 of reversing member 44 would extend past an outside face of the output member 34. The head 47 of reversing member 44 has a parallelepiped shaped end which is keyed into recesses on the back of sockets as is commonly known in this hand tool area. The reversing member 44 is thus rotated in the direction of output member 34. In the roller arrangement embodiment, an engaging member 76 is located on the output member 34' and engages a recess on sockets as is commonly known in the art.

In another application as shown in FIG. 5, an end portion 78 is provided to receive an electric drill bit adapted for driving the apparatus. In this embodiment the handle 21 would be held against rotation and the holding member 31 would be rotated by the electric drill. A hand held bar could also be provided to rotate the holding member 31. By holding the handle 21 stationary and driving the holding member 31, the pinion 24 revolves in a rotational plane parallel to the rotational plane of the annular ring 20 and 22 and drives annular ring 22. The arrangement of the gears would result in the output member rotating in the same direction as the rotation of the holding member 31, but at a different rate of rotation speed depending on the relative diameters of the annular rings 20 and 22.

Figures 6, 7, 8, 8A, 9, 10:
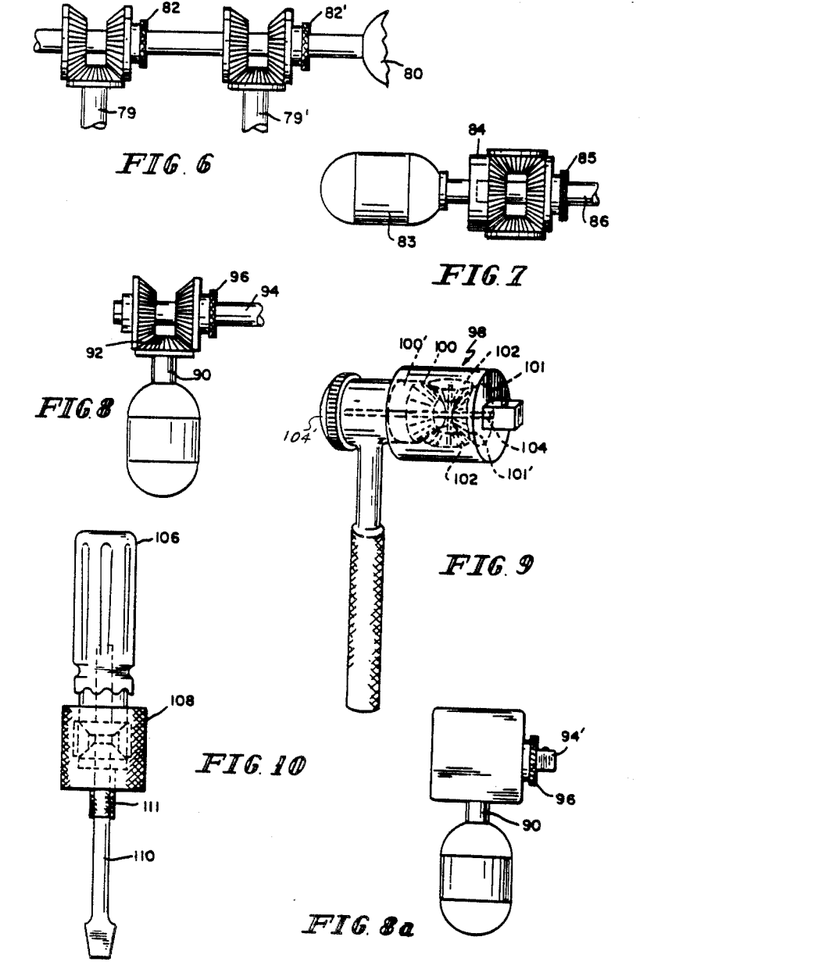
FIG. 6 is a schematic view of another embodiment of the transmission driving means.
FIG. 7 is a schematic view of another embodiment of the transmission driving means.
FIG. 8 is a schematic view of another embodiment of the transmission driving means.
FIG. 8a is a schematic view of another embodiment of the transmission driving means.
FIg. 9 is a schematic view of another embodiment of the transmission driving means.
FIG. 10 is a schematic view of another embodiment of the transmission device.

In a further application as shown in FIG. 6, a plurality of output means 79, 79' transverse to said input means 80 are provided. Each of the output means has a separate reversing means 82, 82' for determining the direction of rotation independently from the other output means.

In a further application as shown in FIG. 7, motor 83 is attached to one of the annular rings 84. A reversing mechanism 85 such as those discussed above is provided to change the direction of rotation of an output member 86 when the input rotational direction from the motor remains the same.

In a further application as shown in FIG. 8, the input member 90 is attached to an intermediate pinion 92 transverse to an output member 94. The reversing means 96 is attached to the output member 94. Thus, in an embodiment as shown in FIG. 8a, the transmission can be used as a reversing feature for a undirectional engine, for example, an electric hand drill. The electrical drill serves as an input member 90'. The reversing means 96 is attached to the output member 94'.

In a further application as shown in FIG. 9, the output means 98 is external to the annular rings 100,101. These annular rings 100, 101 have engaging surfaces 100', 101' respectively, which interact with the output means 98. Intermediate pinions 102 are rotatably mounted on an axle 104 attached to a handheld stationary member 104'.

In a further application as shown in FIG. 10, a screwdriver handle 106 is attached to annular ring 108. A screwdriver head or a nut driver is attached to the output member 110. A reversing member 111 is also provided.

In a further application as shown in FIG. 11, another embodiment of the engaging and reversing members is shown. The pawls 112 are held in place by pin 114 and spring members 116. The pawls 112 are placed within a groove 118 in the output member 120. The groove has cam surfaces 122 and 122' at opposite ends 124, 124' of the pawls 112. The pin 114 positions the pawls 112 to facilitate clockwise output member rotation by placing the ends 124' of the pawls 112 against cam surface 122' of the output member. When the annular rings are rotated in the clockwise direction, the ends 124 of the pawls 112 engage with the annular rings and thereby rotate the output member in the clockwise direction. When the annular rings are rotated in the counter clockwise direction, the ends 124 of the pawls 112 recede toward the groove 118, thereby allowing free rotation of the annular rings in the counterclockwise direction.

For counterclockwise rotation of the output member, the pin 114 is moved toward cam surface 122, and thus moves ends 124 of the pawls toward cam surface 122 of the output member 120. This cam surface urges ends 124' of the pawls 112 toward the annular rings. When the annular rings are rotated in the counterclockwise direction, these annular rings engage the pawls 112 thereby rotating the output member 120 in the counterclockwise direction. When the annular rings are rotated in the clockwise direction, the ends 124' of the pawls 112 recede toward the groove 118, thereby allowing free rotation of the annular rings in the clockwise direction.

In a further application as shown in FIG. 12, the engaging disc 126 is disposed between the annular rings 128 and 128'. These indentations are concave toward the engaging disc 126 at opposite sides 135 and 135'. Rollers 132 are disposed in these roller indentations 130 in between the engaging disc 126 and the annular rings 128, 128'. A positioning ring 136 surrounds the engaging disc 126. The positioning ring 136 has slots 138 for positioning the rollers 132 in the indentations 130. The positioning ring 136 is attached to a reversing control ring 140 by a pin 142 which is positioned in groove 144 of the positioning ring 136.

In the first position, the control ring 140 is moved clockwise to rotate the positioning ring 136 and thereby move the rollers 132 toward the terminating area 135 of the indentations 130. In this position, in response to clockwise rotation of the input member 128, the rollers 132 engage between engaging surfaces 137, 137' of the annular rings 128, 128' rotating in the clockwise direction and the engaging disc 126 connected to the output member 129. In response to the counterclockwise rotation, the rollers 132 allow free rotation of the annular rings 128, 128'.

In the second position, the control ring 140 is moved counterclockwise to rotate the positioning ring 136 counterclockwise, and thereby move the rollers 132 toward the terminating area 135' of the indentations 130. In response to counterclockwise rotation of the annular rings 128, 128', the rollers engage between the engaging surfaces 137, 137' of the annular rings 128, 128' and the engaging member 126 connected to the output member 129. The rollers 132 allow free rotation of the annular rings rotating in the clockwise direction.

Figure 13:
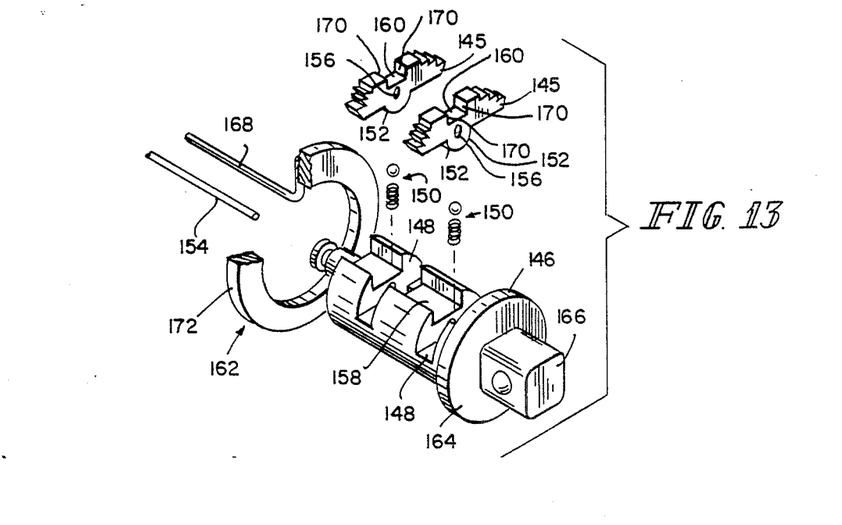
FIG. 13 is an exploded view of a reversing mechanism according to certain preferred embodiments of the present invention.

FIG. 13 shows another embodiment of the reversing mechanism which can be used in the present invention when the engagement element includes the use of pawls 145. An output member 146 includes grooves 148 in which the respective pawls 145 are disposed. A spring and ball arrangement 150 extends out of each groove and engages a projection 152 on each pawl. The pawls are held in the grooves by pin 154 that extends through holes 156 in the pawls and holes (not shown) in the output member 146.

A longitudinal groove 158 is disposed in the output member 146 perpendicular to and running between the two pawl grooves 148. Each pawl 145 includes a groove 160 which is aligned with the longitudinal groove 158 of the output member 146. In certain preferred embodiments, the pawl groove 160 is slightly smaller in width than the longitudinal groove 158 of the output member.

A reversing ring 162 is rotationally disposed around a disk 164 of the output member. The disk 164 includes the tool engaging element 166 extending therefrom. The reversing ring 162 includes a reversing pin 168 which extends away from the tool engaging element 166. The reversing pin 168 extends through pawl grooves 160, as well as the longitudinal output member groove 158.

To operate the reversing member, the reversing ring 162 is moved relative to the output member 146. This is done by merely rotating the reversing ring 162 relative to the output disk 164. When the reversing ring 162 is rotated relative to the output member, the reversing pin 166 slides along the width of the longitudinal groove 158 of the output member, and pushes against one of the sides 170 of the pawl grooves 160 thereby urging the other end of the pawls up and out of the grooves. The ball and spring arrangement 150 cause the pawls to toggle to one of the end positions. Thus, as discussed above, the normal operation of the transmission is achieved by both pawls 144 having the same alignment with respect to the output member. Reversal is achieved simply by rotating the reversing ring 162 in the opposite direction which will move the reversing pin 168 across the width of the longitudinal groove 158 of the output member, and force the opposite end of the pawl up above the pawl groove 148.

Figure 14:
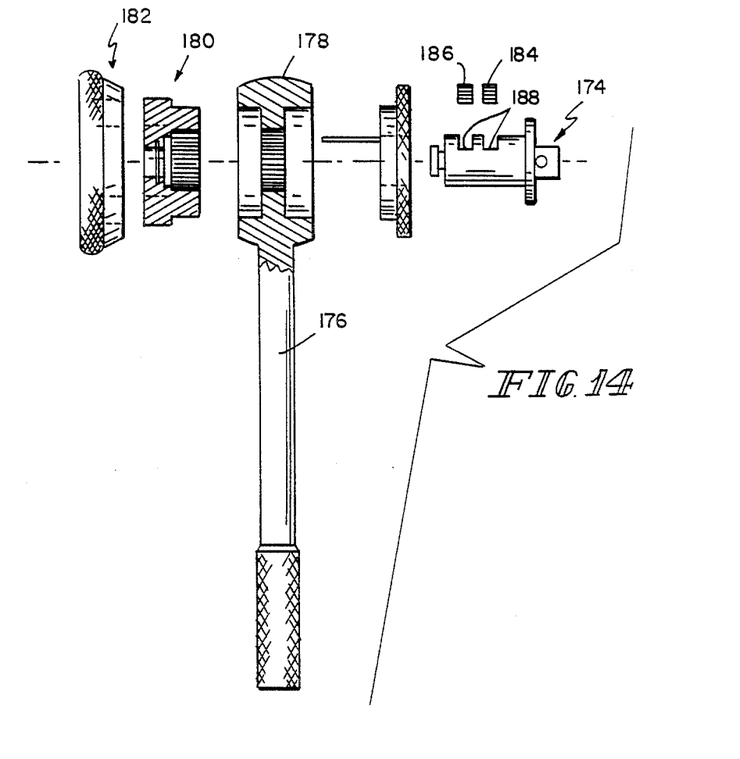
FIG. 14 is an exploded view of another embodiment of the present invention including two input elements.

The reversing mechanism shown in FIG. 13 can be used in any of the transmissions of the present invention. In certain preferred embodiments the reversing ring 162 can include a knurled outer circumference 172 which provides friction for simple turning with the thumb or hand. Another embodiment of the invention is shown in FIG. 14. In this embodiment, independent first and second input elements independently drive the output member. Engaging elements engage each of the input members in the same direction and allow free rotation with respect to the output member of the input members in an opposite direction.

The reversing mechanism used in the embodiment according to FIG. 14 can be that shown in FIG. 13 or any of the reversing mechanisms discussed, or a suitable reversing mechanism. In FIG. 14, an output member 174 is arranged within concentric input members. A handle 176 includes a concentric head 178 which surrounds the output member 174. A second concentric member 180 is rotationally disposed within the handle 176. An outside driving member 182 is fixedly attached to the second concentric member 180. This attachment can be through the use of matching polygonal faces on the outer circumference of the second concentric member 180 which fit into a matching recess of the driving member 182. A first pawl 184 is associated with the first concentric member 178 which is an extension of the handle 176. A second pawl 186 is associated with the second concentric member 180.

Similar to the embodiments discussed thus far, the pawls 184 and 186 are arranged such that the same end of each is facing above grooves 188 of the output member 174. Thus, the output member 174 will only be driven in one direction, and rotation of input members in the opposite direction will ride free on the output member 174. Therefore, independent input through handle 176 or driving member 182 provides unidirectional output. Any of the known reversing mechanisms can be used to reverse the direction of output by moving the opposite ends of the pawls 184 and 186 above the output grooves 188.

The engagement between the first and second concentric members and the pawls in FIG. 14 is the same as the engagement described in FIG. 1. Thus, the concentric members have toothed circumferences which engage with the pawls.

Figure 15:
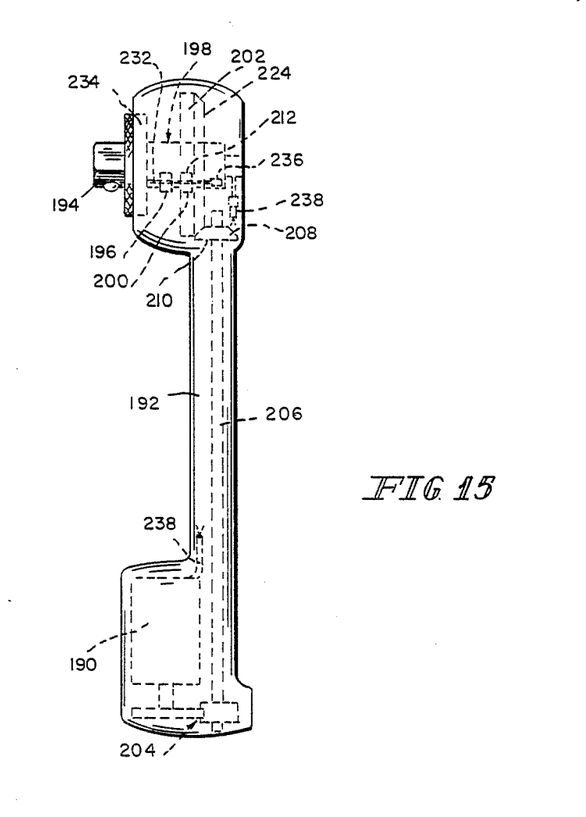
FIG. 15 is a partial cross-sectional view of another embodiment of the present invention including two input elements and a motor.

FIG. 15 shows another embodiment of the invention which includes an automatic motor for driving the output member. The motor 190 is disposed in a handle 192. An output member 194 is rotationally disposed in the handle 192. The output member includes a first pawl 196 which is associated with engaging means 198 in the handle 192. The engaging means 198 can be identical to the engaging means 23 in the handle shown in FIG. 1. This toothed or geared surface may be an integral part of the handle 192 or a ring having an interior toothed or geared surface and mounted in the handle 192.

A second pawl 200 is disposed in the output member 194. A concentric ring 202 is associated with the second pawl 200. The concentric ring 202 is rotationally disposed around the output member 194 and is rotationally free from the handle 192. The concentric ring 202 can include similar radial engaging teeth 28 as the ring 22 shown in FIG. 1. The concentric ring 202 is operated independent from the handle in the handle engaging elements 198.

The motor 190 shown in FIG. 15 includes a gearing mechanism 204 which is attached to a driving shaft 206. At the other end of the driving shaft 206 is a driving gear 208, which includes a tooth gear engagement 210 with the concentric ring 202. The motor 190 is reversible, and thus the driving gear 208 can drive the concentric ring 202 in clockwise or counterclockwise direction as determined by the direction of rotation of the motor 190 and the pawl 200.

As discussed with the embodiment according to FIG. 14, the pawls 196 and 200 are arranged in output grooves 212. The pawls are arranged such that adjacent ends extend above the groove 212 and the opposite adjacent ends are disposed within the groove 212. Therefore, the output member will only be rotated in one direction, and if input is in the direction opposite to this output direction, the pawls will ride free and the output member will not be influenced.

The input from the handle 192 and the motor 190 are completely independent, and if one drives the output faster than the other, it will simply override the slower one.

In the embodiment according to FIG. 15, a battery operated motor 190 can easily drive the output in low torque situations without even moving the handle. When the load becomes too high for the motor, the motor will simply stop and the output can then be driven manually by the handle 192. Drive through the handle 192 through engaging element 198 and pawl 196 puts no load on the gears operating in conjunction with the motor 190.

The unique arrangement shown in FIG. 15 provides motor drive for a wrench, as well as manual drive through the handle. Further, when the torque becomes too high for the motor, the motor merely stops and the wrench can be operated manually through the handle. Further, when operated manually when the motor is stopped, the handle can be rotated directly in the output direction for drive and can ratchet free on the return stroke. This is achieved since the motor is not directly attached to the output member.

It is also possible to operate the output member manually through the handle while the motor is operating. As the motor moves with the handle, this would provide increased output when the handle is rotated in the direction of output, and may decrease output when the handle is swung back opposite to the direction of output rotation. However, as the motor is slowing down due to increased torque, the ultimate result will be greater output rotation if the handle can be moved manually greater than two times the rate at which the motor rotates the output member. This occurs because forces from the motor and the handle are additive on the forward stroke of the output direction which will be at least double the rate at which the motor drives the output. However, the pawls only allow drive in one direction, although the handle will be rotated at a rate greater than double the rate the motor drives the output member, the output member will not be reversed due to the pawl arrangement. Thus, there will be no drive on the backward stroke. However, increased rate of drive on the forward stroke more than compensates for this lack of drive on the back stroke.

Figure 16:
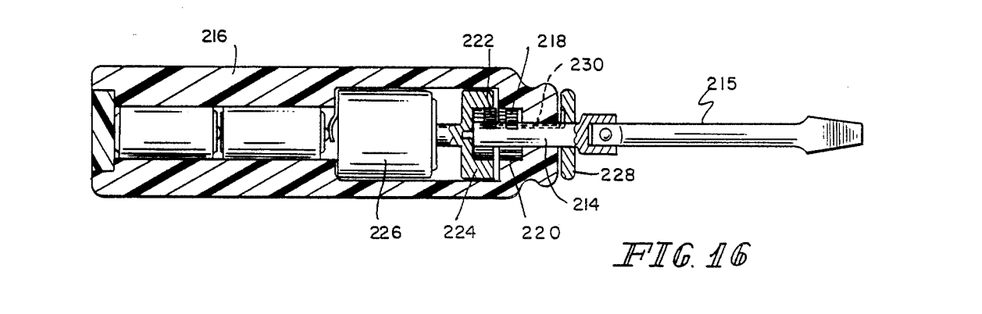
FIG. 16 is a partial cross-sectional view of another embodiment of the present invention including two input elements and a motor.

FIG. 16 shows another embodiment of the present invention using a motor for drive. This embodiment is in the form of a screwdriver. The output member 214, to which is connected a screwdriver shaft and blade 215, is disposed rotationally in a handle 216. The output member 214 includes a first pawl 218 associated with an engaging concentric surface 220 of the handle. Second pawl 222 disposed in the output member 214 is associated with a free concentric ring 224. The concentric ring 224 is shown directly connected to the output of a motor element 226, although it can also be connected through gears. The motor 226 will turn a screw until the torque required is too large. By turning the handle, larger torque can be manually applied to finish the screwing operation. The pawl arrangement allows oscillatory input with single direction output.

A reversing ring 228 is provided which includes a reversing pin 230. This reversing mechanism can be the same as that shown in FIG. 13 or any of the other reversing mechanisms. The operation of the drive is similar to the arrangement shown in FIG. 15. One of the main differences is that the motor is directly connected to the concentric ring 224. The operation and disposition of the pawls are identical to that as shown in FIG. 15. Similarly, the motor 226 is reversible for reversing the direction of output.

The embodiments shown in FIGS. 15 and 16 require a switch for turning the motor on and off, as well as reversing the motor. Further, each of these requires a reversing pin for reversing the direction in which the pawls extend out of their respective grooves and engage the input members. The switches can be separate, or in certain preferred embodiments, can be operated simultaneously.

An example of the simultaneous switching is shown schematically in FIG. 15. In this arrangement, a reversing pin 232 is attached to a reversing ring 234 to reverse the position of the pawls 196 and 200. Electrical contacts 236 are provided on either side wall of the longitudinal groove (158 in FIG. 13) in the output member in which the pin 232 is disposed. Depending on the side in which the pin 232 is moved, a different switch is activated. Thus, if the pin is moved such that clockwise output is dictated by the pawls, the switch automatically moves the motor such that the ring 202 is rotated clockwise. Similarly, when the pin is moved such that the pawls engage in the counterclockwise direction, the switch automatically changes the motor to rotate the ring 202 in the counterclockwise direction. Various electrical contacts can be provided for relaying the signal from the contacts on the output member to the motor. In any event, such a relaying arrangement 236 cannot be fixedly attached to the output member, as the output member can move relative to the handle 192 in which the motor 190 is disposed. Thus, the relay arrangement 236 can be in the form of brushes which are in constant contact with conductive strips along the circumference of the output member, but which are not fixedly attached thereto. The brushes 236 can then have wire connections 238 through the handle 192 to the motor 190. By grounding the reversing pin 232, only a pair of leads, one for each side of the groove, need be provided. Also, since the pawls toggle, they may include electrical contacts and operate as toggle switches.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A transmission comprising:
   first input means rotatable in a first direction and an opposite second direction;
   second input means independently operable from said first input means and rotatable in said first direction and said second direction;
   output means;
   engaging means disposed on said output means for directly engaging between said first input means and said output means and between said second input means and said output means for transferring rotation of said first input means and said second input means to said output means; and
   output reversing means, independently operable from said first and second input means and said output means, for providing a first position of said engaging means such that said engaging means transfer rotation of said first input means and said second input means in said first direction into rotation of said output means in said first direction and for providing a second position of said engaging means such that said engaging means transfer rotation of said first input means and said second input means in said second direction into rotation of said output means in said second direction.

2. A transmission as in claim 1, wherein said engaging means include a first pawl disposed on said output means being associated with said first input means and a second pawl disposed on said output means being associated with said second input means.

3. A transmission as in claim 2, wherein:
   said first input means includes a first concentric member concentric to said output means and said second input member includes a second concentric member concentric to said output means spaced from and in a parallel plane to said first concentric member; said first pawl being associated with said first concentric member and said second pawl being associated with said second concentric member; and said output reversing means include a first position for engaging each of said pawls with said concentric members in response to a first direction of rotation of said concentric members and for disengaging each of said pawls from said concentric members in response to a second direction of rotation of said concentric members and include a second position for engaging each of said pawls with said concentric members in response to a second direction of rotation of said concentric members and for disengaging each of said pawls from said concentric members in response to a first direction of rotation of said concentric members, wherein said output means rotates in the direction in which the engaged concentric members rotate.

4. A transmission as in claim 3, including:
a gripping surface on each concentric member;
a first end of each pawl having a gripping surface for engaging said concentric members in response to a first direction of rotation of said concentric members, in said first position of said output reversing means; and
a second end of each pawl having a gripping surface for engaging said concentric members in response to said second direction of rotation of said concentric members, in said second position of said output reversing means.

5. A transmission as in claim 4 wherein said output reversing means includes a cam means for urging said first end gripping surfaces of said first and second pawls against said concentric members for engaging the output means with the concentric members, in said first position of the output reversing means; and for urging said second end gripping surfaces of said first and second pawls against said concentric members for engaging the output means with the concentric members, in said second position of the output reversing means.

6. A transmission as in claim 5, wherein said pawls are held on a fixed axis of rotation relative to said output means and wherein said cam means includes spring means on said output means for forcing said pawls to rotate around said fixed axis for engaging the output means with the concentric members, said first and second position for the output reversing means being changed by moving said spring means from a position towards one end of said pawls to a position towards the other end of said pawls.

7. A transmission comprising:
first input means rotatable in a first direction and an opposite second direction;
second input means independently operable from said first input means and rotatable in said first direction and said second direction;
motor means for automatically driving said second input means;
output means;
engaging means for directly engaging between said first input means and said output means and between said second input means and said output means for transferring rotation of said first input means and said second input means to said output means; and output reversing means for providing a first position of said engaging means such that said engaging means transfer rotation of said first input means and said second input means in said first direction into rotation of said output means in said first direction and for providing a second position of said engaging means such that said engaging means transfer rotation of said first input means and said second input means in said second direction into rotation of said output means in said second direction.

8. A transmission as in claim 7, further including a handle means for manually driving said first input means and said motor means being disposed in said handle means.

9. A transmission as in claim 8, wherein said engaging means include:
a first pawl means disposed on said output member, said first pawl means being associated with said handle means; and
a second pawl means disposed on said output member, said second pawl means being associated with said second input means.

10. A transmission as in claim 8, wherein said second input means includes a concentric member mounted rotationally free of said handle means concentric to said output means and driven by said motor means in one of said first direction and said second direction; and further including motor reversing means having a first position such that said motor means drives said concentric member in said first direction and having a second position such that said motor means drives said concentric member in said second direction.

11. A transmission as in claim 10, further including switching means for switching said output reversing means between said first and said second positions and switching said motor reversing means between said first and second positions.

12. A transmission as in claim 11, wherein said switching means simultaneously switches said output reversing means and said motor reversing means such that both are simultaneously switched to one of said first position and said second position.

13. A transmission comprising:
first input means including first disk having a gripping surface and rotatable in a first direction and an opposite second direction;
second input means independently operable from said first input means and including a second disk having a gripping surface and rotatable in said first direction and said second direction;
output means;
engaging means for directly engaging between said first input means and said output means and between said second input means and said output means for transferring rotation of said first input means and said second input means to said output means;
said engaging means including a central disk having a first surface facing toward said first disk's gripping surface and a second surface facing toward said second disk's gripping surface, and at least one roller indentation and a roller therein in each of said first and second surfaces; and
output reversing means for providing a first position of the engaging means for wedging said rollers between the roller identations of said central disk and said first and second disks in response to rotation of said first and second disks in a first direction and for allowing free rotation of said first and second disks rotating in a second direction thereby rotating said output means in said first direction, and for providing a second position of the engaging means for wedging said rollers between the roller indentations of said central disk and said first and second disks in response to rotation of said first and second disks in said second direction and for allowing free rotation of said first and second disks rotating in said first direction, thereby rotating said output means in said second direction.

* * * * *